United States Patent
Hu et al.

(10) Patent No.: US 12,412,985 B2
(45) Date of Patent: Sep. 9, 2025

(54) TERMINAL ANTENNA

(71) Applicant: Honor Device Co., Ltd., Shenzhen (CN)

(72) Inventors: Yiwu Hu, Shenzhen (CN); Kunpeng Wei, Shenzhen (CN); Shaojie Chu, Shenzhen (CN); Yang Lu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/561,572

(22) PCT Filed: Apr. 28, 2023

(86) PCT No.: PCT/CN2023/091853
§ 371 (c)(1),
(2) Date: Nov. 16, 2023

(87) PCT Pub. No.: WO2024/007711
PCT Pub. Date: Jan. 11, 2024

(65) Prior Publication Data
US 2025/0087889 A1    Mar. 13, 2025

(30) Foreign Application Priority Data
Jul. 8, 2022 (CN) .......................... 202210799849.4

(51) Int. Cl.
*H01Q 9/04* (2006.01)
*H01Q 1/24* (2006.01)
*H01Q 1/48* (2006.01)

(52) U.S. Cl.
CPC ........... *H01Q 9/0421* (2013.01); *H01Q 1/243* (2013.01); *H01Q 1/48* (2013.01)

(58) Field of Classification Search
None
See application file for complete search history.

(56) References Cited

U.S. PATENT DOCUMENTS

| 9,407,237 B2 | 8/2016 | Ikeuchi |
| 10,622,702 B2 * | 4/2020 | Guo .......................... H01Q 1/44 |

(Continued)

FOREIGN PATENT DOCUMENTS

| CN | 101145634 A | 3/2008 |
| CN | 101527552 A | 9/2009 |

(Continued)

OTHER PUBLICATIONS

Tang Hua, "Research on Massive MIMO Antenna Technologies", University of Electronic Science and Technology of China, Jan. 15, 2019, total 140 pages.

(Continued)

Primary Examiner — Crystal L Hammond
(74) Attorney, Agent, or Firm — Slater Matsil, LLP

(57) ABSTRACT

Embodiments of this application relate to the field of antennas, and provide a terminal antenna. The terminal antenna includes n radiators. The n radiators include a first radiator, a second radiator, and a third radiator. Lengths of the first radiator, the second radiator, and the third radiator form a descending arithmetic progression. The first radiator, the second radiator, and the third radiator are arranged in sequence to form two gaps. A coupling capacitance formed by the first radiator and the second radiator through the corresponding gap is greater than a coupling capacitance formed by the second radiator and the third radiator through the corresponding gap. The first radiator, the second radiator, and the third radiator are any three of the n radiators distributed in sequence.

20 Claims, 12 Drawing Sheets

(56) References Cited

U.S. PATENT DOCUMENTS

| | | | |
|---|---|---|---|
| 11,342,651 | B2 | 5/2022 | Ma et al. |
| 2017/0264975 | A1 | 9/2017 | Wong et al. |

FOREIGN PATENT DOCUMENTS

| | | | | |
|---|---|---|---|---|
| CN | 101710644 | A | | 5/2010 |
| CN | 102170044 | A | | 8/2011 |
| CN | 103560322 | A | | 2/2014 |
| CN | 106972244 | A | | 7/2017 |
| CN | 108682957 | A | | 10/2018 |
| CN | 210640362 | U | * | 5/2020 |
| CN | 210984950 | U | | 7/2020 |
| CN | 111725608 | A | | 9/2020 |
| CN | 215869785 | U | | 2/2022 |
| CN | 114171900 | A | | 3/2022 |
| CN | 112042054 | B | | 4/2022 |
| CN | 114865291 | A | | 8/2022 |
| JP | 2008236046 | A | | 10/2008 |
| JP | 2014187455 | A | | 10/2014 |
| JP | 2015177454 | A | | 10/2015 |
| KR | 20110048117 | A | | 5/2011 |

OTHER PUBLICATIONS

J. Xu, Q. Zhang, L. Zhou and C. Chen, "A Wideband Horizontal Polarized Omnidirectional Loop Antenna," 2018 IEEE International Symposium on Antennas and Propagation & USNC/URSI National Radio Science Meeting, Boston, MA, USA, Jul. 8-13, 2018, pp. 657-658.

K. Okubo, M. Kishihara, A. Yamamoto, J. Yamakita and I. Ohta, "New composite right/left-handed transmission line using substrate integrated waveguide and metal-patches," 2009 IEEE MTT-S International Microwave Symposium Digest, Boston, MA, USA, Jun. 7-12, 2009, pp. 41-44.

* cited by examiner

TERMINAL ANTENNA

CROSS-REFERENCE TO RELATED APPLICATIONS

This application is a national stage of International Application No. PCT/CN2023/091853, filed on Apr. 28, 2023, which claims priority to Chinese Patent Application No. 202210799849.4, filed on Jul. 8, 2022. The disclosures of both of the aforementioned applications are hereby incorporated by reference in their entireties.

TECHNICAL FIELD

Embodiments of this application relate to the field of antennas, and in particular, to a terminal antenna.

BACKGROUND

With the continuous development of communication technologies, people have increasing requirements on communication performance of a terminal device. An antenna in the terminal device is an important factor for the communication performance of the terminal device. The antenna in the terminal device may also be referred to as a terminal antenna. For example, a higher radiation efficiency of the terminal antenna indicates better communication performance of the corresponding terminal device.

Therefore, how to improve the radiation efficiency of the terminal antenna is a problem urgently to be resolved.

SUMMARY

Embodiments of this application provide a terminal antenna, which can improve a radiation efficiency of a terminal antenna.

In order to achieve the foregoing objective, the following technical solutions are used in the embodiments of this application.

A terminal antenna is provided, including: n radiators. The n radiators include a first radiator, a second radiator, and a third radiator. Lengths of the first radiator, the second radiator, and the third radiator form a descending arithmetic progression. The first radiator, the second radiator, and the third radiator are arranged in sequence to form two gaps. A coupling capacitance formed by the first radiator and the second radiator through the corresponding gap is greater than a coupling capacitance formed by the second radiator and the third radiator through the corresponding gap. The first radiator, the second radiator, and the third radiator are any three of the n radiators distributed in sequence. One end of the terminal antenna is connected to a ground point, and the other end of the terminal antenna is connected to a feed point. A radiator connected to the ground point is a shortest one of the n radiators, and a radiator connected to the feed point is a longest one of the n radiators.

Based on the solution, after a current flows into the radiator through the feed point, a larger distance by which the current flows indicates a smaller length of the radiator through which the current passes and indicates a smaller capacitance value of a capacitor through which the current passes. In this way, losses of the current on the radiators and on the capacitors gradually decrease, and current distribution on the radiators is relatively uniform, so that a total loss power of the current is relatively small. Therefore, the radiation efficiency of the terminal antenna is relatively high.

In a possible design, the terminal antenna further includes a columnar support. The first radiator, the second radiator, and the third radiator each are a copper foil and in an inverted L-shape, and are arranged on a side surface of the support in sequence. Based on the solution, a volume of the terminal antenna is reduced, thereby reducing costs of the terminal antenna.

In a possible design, the first radiator is interdigitally coupled to the second radiator. The second radiator is interdigitally coupled to the third radiator. Based on the solution, a coupling amount of the radiators can be improved, thereby improving the radiation efficiency of the terminal antenna.

In a possible design, a suspended copper foil is arranged at each of a coupled position between the first radiator and the second radiator and a coupled position between the second radiator and the third radiator. The coupled position between the first radiator and the second radiator and the corresponding suspended copper foil form a coupling capacitance. The coupled position between the second radiator and the third radiator and the corresponding suspended copper foil form a coupling capacitance. Based on the solution, the coupling amount of the radiators can be improved, thereby improving the radiation efficiency of the terminal antenna.

In a possible design, n=3. A total coupling capacitance between the first radiator and the second radiator is 1 pF. A total coupling capacitance between the second radiator and the third radiator is 0.45 pF. The total coupling capacitance between the first radiator and the second radiator includes the coupling capacitance between the first radiator and the second radiator and the coupling capacitance formed by the coupled position between the first radiator and the second radiator and the corresponding suspended copper foil. The total coupling capacitance between the second radiator and the third radiator includes the coupling capacitance between the second radiator and the third radiator and the coupling capacitance formed by the coupled position between the second radiator and the third radiator and the corresponding suspended copper foil. Based on the solution, the total coupling capacitance between the first radiator and the second radiator is set to 1 pF, and the total coupling capacitance between the second radiator and the third radiator is set to 0.45 pF, which reduces a space occupied by the coupled positions between the radiators, thereby reducing the volume of the terminal antenna, and facilitating arrangement of the terminal device into terminal devices such as a mobile phone.

In a possible design, the length of the first radiator is 10 mm. The length of the second radiator is 9 mm. The length of the third radiator is 8 mm. Based on the solution, the terminal antenna can be arranged in the terminal devices such as a mobile phone more conveniently, thereby improving communication performance of the corresponding terminal device.

In a possible design, the length of the first radiator is 14.7 mm. The length of the second radiator is 13.1 mm. The length of the third radiator is 10.6 mm. Based on the solution, the terminal antenna can be arranged in the terminal devices such as a mobile phone more conveniently, thereby improving communication performance of the corresponding terminal device.

In a possible design, a coupling area of the coupling capacitance formed by the coupled position between the first radiator and the second radiator and the corresponding suspended copper foil is 5.6 mm×2.9 mm. A coupling area of the coupling capacitance formed by the coupled position between the second radiator and the third radiator and the corresponding suspended copper foil is 2.9 mm×2.9 mm. Based on the solution, the coupling capacitance formed by the coupled position between the first radiator and the second radiator and the corresponding suspended copper foil is greater than the coupling capacitance formed by the coupled position between the second radiator and the third radiator and the corresponding suspended copper foil, which improves the radiation efficiency of the terminal antenna.

In a possible design, thicknesses of the first radiator, the second radiator, and the third radiator are all 0.05 mm. Based on the solution, the volume of the radiator is reduced while the radiation performance of the terminal antenna is ensured, thereby facilitating arrangement of the terminal device into terminal devices such as a mobile phone.

In a possible design, an operating frequency band of the terminal antenna is 2.4 GHz. Based on the solution, the radiation efficiency of the terminal antenna in the frequency band of 2.4 GHz can be improved.

In a possible design, a width of a clearance area of the terminal antenna is 1.5 mm. Based on the solution, external interferences to the terminal antenna can be reduced, thereby improving the radiation efficiency of the terminal antenna.

DETAILED DESCRIPTION OF ILLUSTRATIVE EMBODIMENTS

"First", "second", "third", and the like in embodiments of this application are intended to distinguish between different objects but do define a particular order. In addition, the term "as an example" or "for example" indicates giving an example, an illustration, or a description. Any embodiment or design solution described as "in an example" or "for example" in the embodiments of this application should not explained as being more preferred or having more advantages than another embodiment or design solution. Exactly, use of the terms such as "in an example" or "for example" is intended to present a concept in a specific manner.

In order to facilitating understanding the embodiments of this application, application background of this application is described first below.

As people have increasing requirements on terminal devices for aesthetics and convenience, the terminal devices gradually develop toward full metallization, thinness, and a high screen ratio.

Since metal shields electromagnetic signals, full metallization of terminal devices usually means a design of metal with a window. Metal with a window is a solution of using a metal rear cover and providing a window on a housing for arranging an antenna.

Figure 1:
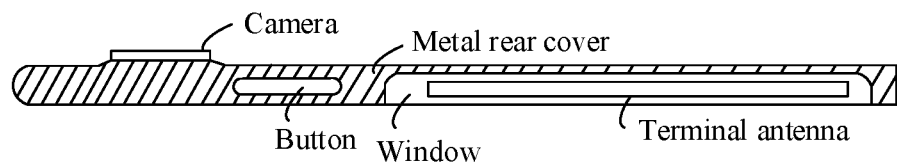
FIG. 1 is a schematic side view of a terminal device.

FIG. 1 is a schematic side view of a terminal device. As shown in FIG. 1, the terminal device includes a camera, a button, and a metal rear cover. A window may be arranged on a side of the metal rear cover. A terminal antenna may be arranged in the window.

It may be understood that although the window is arranged on the metal rear cover, due to the shielding characteristic of metal for electromagnetic signals, signals received or sent by the terminal antenna are still interfered by the metal rear cover, affecting a communication capability of the terminal antenna.

For example, the terminal antenna is a zeroth-order mode antenna. The zeroth-order mode antenna is an antenna with an MNG-TL (Mu-Negative Transmission Line, mu-negative transmission line) unit structure.

Figure 2:
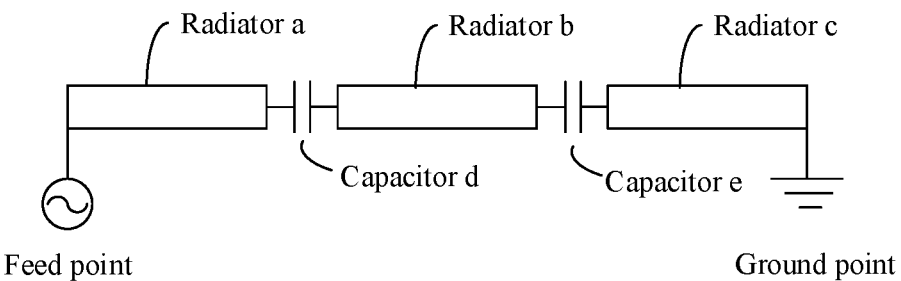
FIG. 2 is a schematic diagram of a triple zeroth-order mode antenna.

FIG. 2 is a schematic diagram of a triple zeroth-order mode antenna. As shown in FIG. 2, the triple zeroth-order mode antenna includes a radiator a, a radiator b, a radiator c, a capacitor d, and a capacitor e. One end of the radiator a is connected to a feed point, and the other end thereof is connected to the radiator b through the capacitor d. An end of the radiator b away from the capacitor d is connected to the radiator c through the capacitor e. An end of the radiator c away from the capacitor e is connected to a ground point.

Effective lengths of the radiator a, the radiator b, and the radiator c are equal. A capacitance value of the capacitor d is equal to a capacitance value of the capacitor e. The effective length of the radiator may be a length of a connected circuit.

The mu-negative transmission line unit structure may be equivalent to a resonator. The zeroth-order mode antenna may be formed through periodic loading of a plurality of mu-negative transmission line unit structures.

Figure 3:
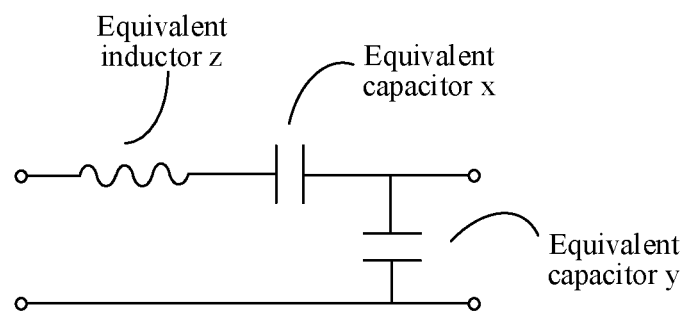
FIG. 3 is a schematic diagram of an equivalent circuit of a mu-negative transmission line unit structure.

As an example, FIG. 3 is a schematic diagram of an equivalent circuit of a mu-negative transmission line unit structure. As shown in FIG. 3, the mu-negative transmission line unit structure may be equivalent to a resonator composed of an equivalent inductor z, an equivalent capacitor x, and an equivalent capacitor y.

It may be understood that the equivalent circuit diagram of the triple zeroth-order mode antenna shown in FIG. 2 is formed through periodic loading of three equivalent circuits shown in FIG. 3.

During operation of the triple zeroth-order mode antenna shown in FIG. 2, operating currents are concentrated on a side where the ground point is located, which affects a radiation efficiency of the antenna.

The radiation efficiency of the antenna is a ratio of a radiation power of the antenna to an active-power input of the antenna. The radiation power is a power of a signal radiated by the antenna. The active-power input is a difference between a total input power and a loss power of the antenna. The loss power includes a port loss, a heat loss, and the like.

When operating current distribution on the radiators is non-uniform, the loss power of the terminal antenna increases, resulting in a decrease in the active-power input, and thus reducing the radiation efficiency of the terminal antenna.

Therefore, how to improve the radiation efficiency of the terminal antenna is a problem urgently to be resolved.

In order to resolve the problem, an embodiment of this application provides a terminal antenna with a desirable radiation efficiency and bandwidth, which can realize desirable communication performance for a terminal device equipped with the terminal antenna.

As an example, the terminal antenna provided in this embodiment of this application may be arranged in the window of the terminal device shown in FIG. 1.

It may be understood that the above is merely an example. The terminal antenna provided in this embodiment of this application may be arranged at another position of the terminal device shown in FIG. 1, or may be arranged in a terminal device having another structure. This is not specifically limited herein.

In this embodiment of this application, the terminal device may be a device with an antenna, such as a mobile phone, a tablet computer, a wearable device (such as a smartwatch), an on-board device, a laptop (Laptop) computer, or a desktop computer. An example embodiment of the terminal device includes but is not limited to a portable terminal carrying IOS®, Android®, Microsoft®, or another operating system.

Figure 4:
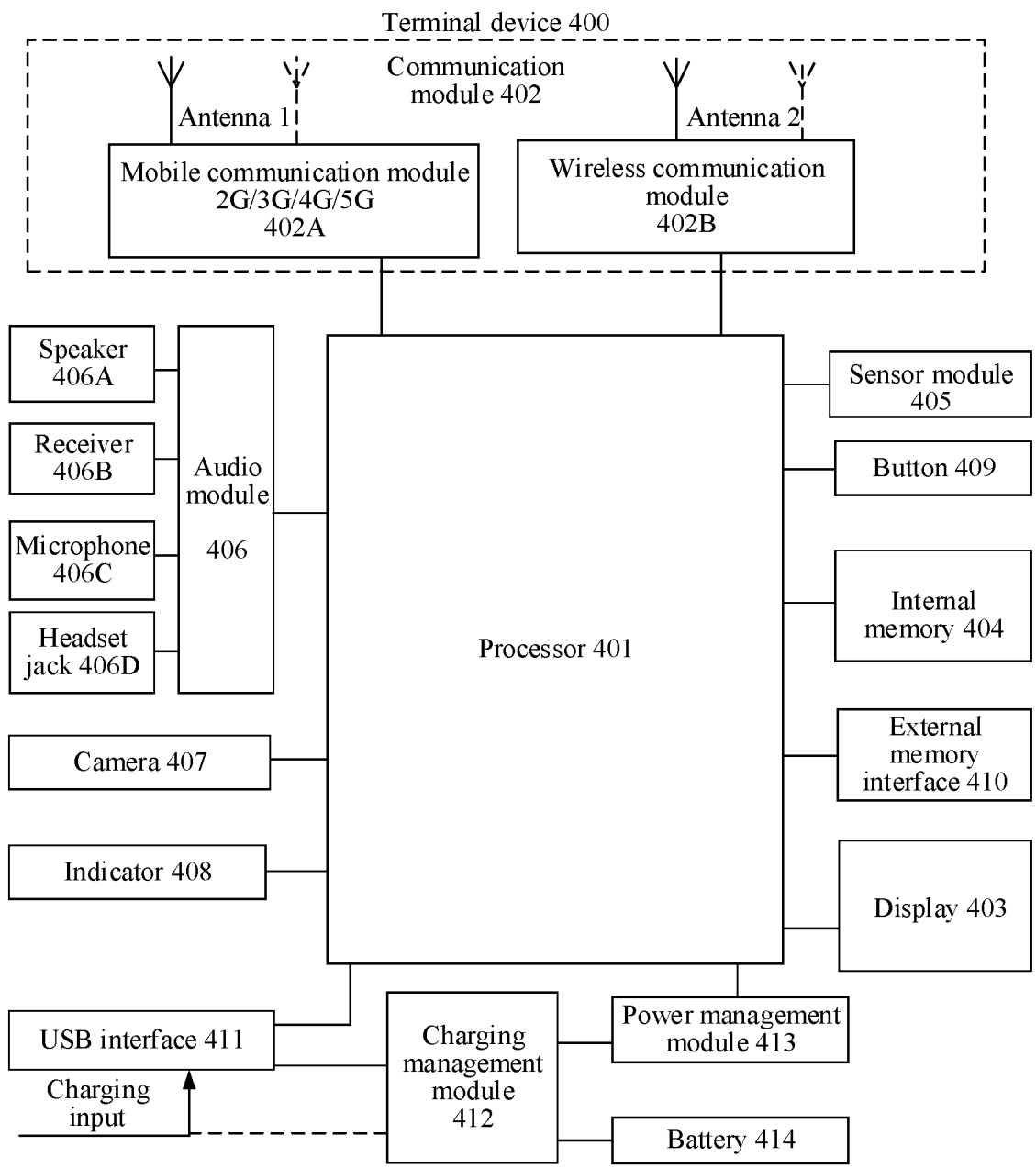
FIG. 4 is a schematic structural diagram of a terminal device according to an embodiment of this application.

As an example, FIG. 4 is a schematic structural diagram of a terminal device 400 according to an embodiment of this application.

As shown in FIG. 4, the terminal device 400 may include a processor 401, a communication module 402, a display 403, and the like.

The processor 401 may include one or more processing units. For example, the processor 401 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors 401.

The controller may be a nerve center and command center of the terminal device 400. The controller may generate an operation control signal based on an instruction operation code and a timing signal, to control instruction fetch and instruction execution.

The memory may be further arranged in the processor 401 to store instructions and data. In some embodiments, the memory in the processor 401 is a cache. The memory may store instructions or data recently used or cyclically used by the processor 401. If the processor 401 needs to use the instructions or the data again, the processor may directly invoke the instructions or the data from the memory. This avoids repeated access, and reduces a waiting time of the processor 401, and therefore improves system efficiency.

In some embodiments, the processor 401 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor 401 interface (mobile industry processor interface, MIPI), a general-purpose input/output (general-purpose input/output, GPIO) interface, a subscriber identity module (subscriber identity module, SIM) interface, a universal serial bus (universal serial bus, USB) interface 411, and/or the like.

The terminal device 400 implements a display function by using the GPU, the display 403, the application processor 401, and the like. The GPU is a microprocessor for image processing, and is connected to the display 403 and the application processor 401. The GPU is configured to perform mathematical and geometric calculations and graphics rendering. The processor 401 may include one or more GPUs that execute program instructions to generate or change display information.

The display 403 is configured to display an image, a video stream, and the like.

The communication module 402 may include an antenna 1, an antenna 2, a mobile communication module 402A, and/or a wireless communication module 402B. For example, the communication module 402 includes the antenna 1, the antenna 2, the mobile communication module 402A, and the wireless communication module 402B.

A wireless communication function of the terminal device 400 may be implemented by using the antenna 1, the antenna 2, the mobile communication module 402A, the wireless communication module 402B, the modem processor, the baseband processor, and the like.

The antenna 1 and the antenna 2 are configured to transmit and receive an electromagnetic wave signal. Each antenna in the terminal device 400 may be configured to cover a single communication frequency band or a plurality of communication frequency bands. Different antennas may be multiplexed to improve utilization of the antennas. For example, the antenna 1 may be multiplexed into a diversity antenna of a wireless local area network. In some other embodiments, the antennas may be used with a tuning switch.

The mobile communication module 402A may provide a wireless communication solution applicable to the terminal device 400, including 2G/3G/4G/5G and the like. The mobile communication module 402A may include at least one filter, a switch, a power amplifier, a low noise amplifier (low noise amplifier, LNA), and the like.

The mobile communication module 402A may receive an electromagnetic wave through the antenna 1, perform processing such as filtering and amplification on the received electromagnetic wave, and transmit the processed electromagnetic wave to the modem processor for demodulation. The mobile communication module 402A may further amplify a signal modulated by the modem processor, and convert the signal into an electromagnetic wave through the antenna 1 for radiation.

In some embodiments, at least some functional modules of the mobile communication module 402A may be arranged in the processor 401.

In some embodiments, at least some functional modules of the mobile communication module 402A may be arranged in a same device as at least some modules of the processor 401.

The modem processor may include a modulator and a demodulator. The modulator is configured to modulate a to-be-transmitted low-frequency baseband signal into a medium and high frequency signal. The demodulator is configured to demodulate the received electromagnetic wave signal into a low-frequency baseband signal. Then the demodulator transmits the demodulated low-frequency baseband signal to the baseband processor for processing. The low-frequency baseband signal is processed by the baseband processor and then transmitted to the application processor. The application processor outputs a sound signal through an audio device (which is not limited to a speaker 406A or a phone receiver 406B), or display an image or a video stream through the display 403. In some embodiments, the modem processor may be an independent device. In some other embodiments, the modem processor may be independent of the processor 401, and is arranged in a same device as the mobile communication module 402A or another functional module.

The wireless communication module 402B may provide a wireless communication solution applicable to the terminal device 400, including a wireless local area network (wireless local area network, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, and an infrared (infrared, IR) technology. The wireless communication module 402B may be one or more components into which at least one communication processing module is integrated. The wireless communication module 402B receives an electromagnetic wave through the antenna 2, performs frequency modulation and filtering processing on the electromagnetic wave signal, and transmits a processed signal to the processor 401. The wireless communication module 402B may further receive a to-be-transmitted signal from the processor 401, perform frequency modulation and amplification on the to-be-transmitted signal, and convert the to-be-transmitted signal into an electromagnetic wave through the antenna 2 for radiation.

In some embodiments, in the terminal device 400, the antenna 1 is coupled to the mobile communication module 402A, and the antenna 2 is coupled to the wireless communication module 402B, so that the terminal device 400 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), the BT, the GNSS, the WLAN, the NFC, the FM, the IR technology, and/or the like. The GNSS may include a global positioning system (global positioning system, GPS), a global navigation satellite system (global navigation satellite system, GLONASS), a Beidou navigation satellite system (beidou navigation satellite system, BDS), a quasi-zenith satellite system (quasi-zenith satellite system, QZSS) and/or a satellite based augmentation system (satellite based augmentation systems, SBAS).

As shown in FIG. 4, in some implementations, the terminal device 400 may further include an external memory interface 410, an internal memory 404, a universal serial bus (universal serial bus, USB) interface 411, a charging management module 412, a power management module 413, a battery 414, an audio module 406, the speaker 406A, the receiver 406B, a microphone 406C, a headset jack 406D, a sensor module 405, a button 409, a motor, an indicator 408, a camera 407, an SIM (subscriber identification module, subscriber identity module) card interface, and the like.

The charging management module 412 is configured to receive a charging input from a charger. The charger may be a wireless charger or a wired charger. In some embodiments of wired charging, the charging management module 412 may receive a charging input of the wired charger by using the USB interface 411. In some embodiments of wireless charging, the charging management module 412 may receive a wireless charging input by using a wireless charging coil of the terminal device 400. The charging management module 412 may further supply power to the terminal device 400 through a power management module 413 while charging the battery 414.

The power management module 413 is configured to be connected to the battery 414, the charging management module 412, and the processor 401. The power management module 413 receives an input from the battery 414 and/or the charging management module 412, to supply power to the processor 401, the internal memory 404, the external memory, the display 403, the camera 407, the wireless communication module 402B, and the like. The power management module 413 may be further configured to monitor a parameter such as a capacity of the battery 414, recycling times of the battery 414, or a health state (electric leakage and impedance) of the battery 414. In some other embodiments, the power management module 413 may be arranged in the processor 401. In some other embodiments, the power management module 413 and the charging management module 412 may be arranged in a same device.

The external memory interface 410 may be configured to connect to an external storage card such as a Micro SD card, to expand a storage capability of the terminal device 400. The external storage card communicates with the processor 401 by using the external memory interface 410, to implement a data storage function. For example, files such as music and video streams are stored in the external storage card.

The internal memory 404 may be configured to store computer-executable program code. The executable program code includes instructions. The processor 401 runs the instructions stored in the internal memory 404, to implement various functional applications and data processing of the terminal device 400.

The terminal device 400 may implement an audio function, for example, music playback and recording, by using the audio module 406, the speaker 406A, the receiver 406B, the microphone 406C, the headset jack 406D, the application processor 401, and the like.

The button 409 includes a power button, a volume button, and the like. The button 409 may be a mechanical button 409, or may be a touch button 409. The terminal device 400 may receive an input from the button 409, and generate a button signal input related to a user setting and function control of the terminal device 400.

The indicator 408 may be an indicator light, and may be configured to indicate a charging state or a power change, or may be configured to indicate a message, a missed call, a notification, and the like.

The SIM card interface is configured to connect a SIM card.

The sensor module 405 in the terminal device 400 may include components such as a touch sensor, a pressure sensor, a gyroscope sensor, a barometric pressure sensor, a magnetic sensor, an acceleration sensor, a distance sensor, an optical proximity sensor, an ambient light sensor, a fingerprint sensor, a temperature sensor, and a bone conduction sensor, to achieve sensing and/or acquisition of different signals.

It may be understood that the structure shown in this embodiment does not constitute a specific limitation on the terminal device 400. In some other embodiments, the terminal device 400 may include more or fewer components than those shown in the figure, or some components may be combined, or some components may be split, or components may be arranged in different manners. The components shown in the figure may be implemented by hardware, software, or a combination of software and hardware.

The terminal antenna provided in this embodiment of this application may be arranged in the terminal device shown in FIG. 4. As an example, the terminal antenna provided in this embodiment of this application may be the foregoing antenna 1 or antenna 2.

The terminal antenna provided in this embodiment of this application is described in detail below.

Figure 5:
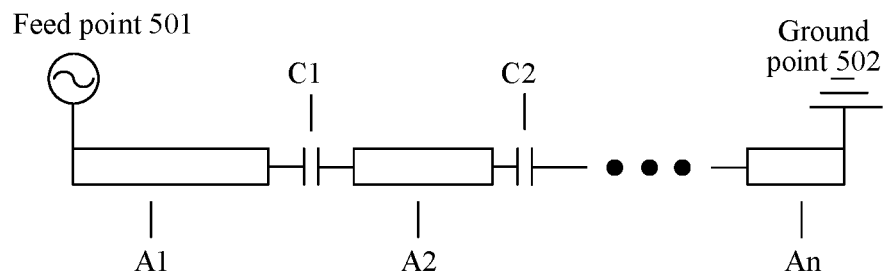
FIG. 5 is a schematic diagram of a terminal antenna according to an embodiment of this application.

FIG. 5 a schematic diagram of a terminal antenna according to an embodiment of this application. As shown in FIG. 5, the terminal antenna includes n radiators. The n radiators are A1, A2, A3, . . . , An. n is an integer greater than or equal to 3. An end surface of one end of Ai is coupled to A (i−1) to form a distributed capacitor C (i−1). An end surface of the other end of Ai is coupled to A (i+1) to form a distributed capacitor Ci. i is an integer greater than or equal to 2 and less than or equal to n−1. An end of A1 away from A2 is connected to a feed point 501, and an end of An away from A (n−1) is connected to a ground point 502. Lengths of A1, A2, A3, . . . , An form a descending arithmetic progression. Capacitance values of C1, C2, . . . , C (n−1) successively decrease.

The n radiators each may be a flake-shaped copper foil.

It may be understood that n−1 distributed capacitors are arranged in the terminal antenna shown in FIG. 5. A distributed capacitor C1 is formed between A1 and A2, a distributed capacitor C2 is formed between A2 and A3, a distributed capacitor C3 formed between A3 and A4, and so on. In this case, a C (n−1) distributed capacitor is formed between A (n−1) and An.

Lengths of A1, A2, A3, . . . , An form a descending arithmetic progression. In other words, the lengths L1, L2, L3, . . . , Ln of A1, A2, A3, . . . , An satisfy the following formula (1).

$$Li - L(i-1) = L(i+1) - L(i). \quad \text{Formula (1)}$$

The capacitance values of C1, C2, . . . , C (n−1) satisfy the following formula (2).

$$C1 > C2 > C3 > \ldots > C(n-1). \quad \text{Formula (2)}$$

In the terminal antenna provided in FIG. 5 above, C1, C2, . . . , C (n−1) each are a distributed capacitor.

In some embodiments, all of C1, C2, . . . , C (n−1) may be replaced with lumped capacitors. That is to say, neither the end surface of the end of Ai needs to be coupled to A (i−1) to form the distributed capacitor C (i−1), nor the end surface of the other end of Ai needs to be coupled to A (i+1) to form the distributed capacitor Ci. Instead, the end of Ai is connected to A (i−1) through a lumped capacitor S (i−1), and the other end of Ai is connected to A (i+1) through a lumped capacitor Si.

Similarly, capacitance values of S1, S2, . . . , S (n−1) satisfy the following formula (3).

$$S1 > S2 > S3 > \ldots > S(n-1). \quad \text{Formula (3)}$$

In some other embodiments, some of C1, C2, . . . , C (n−1) may be replaced with lumped capacitors. Details are not described herein.

In the terminal antenna provided in this embodiment of this application, a position closer to the feed point indicates a larger length of the radiator and a larger capacitance value of the capacitor, and a position closer to the ground point indicates a smaller length of the radiator and a smaller capacitance value of the capacitor. The lengths of the radiators from the feed point to the ground point form a descending arithmetic progression. During operation of the terminal antenna, a current flows into the radiator through the feed point. A larger distance by which the current flows indicates a smaller length of the radiator through which the current passes and indicates a smaller capacitance value of the capacitor through which the current passes. In this way, current densities of the radiators are more uniform, thereby reducing a loss power and improving a radiation efficiency of the terminal antenna.

In the terminal antenna shown in FIG. 5, n radiators are arranged. However, it may be understood that, in simulation experiments and practical application, a number and lengths of radiators and capacitances values of capacitors should be specified. The following uses n=3 as an example to describe the terminal antenna provided in this embodiment of this application again.

It should be noted that n=3 is merely an example of the terminal antenna shown in FIG. 5. In some other embodiments, n may be any value greater than 3, such as 4, 5, or 6. The corresponding terminal antenna can achieve similar effects as the terminal antenna for which n=3. This is not described in detail below.

Figure 6:
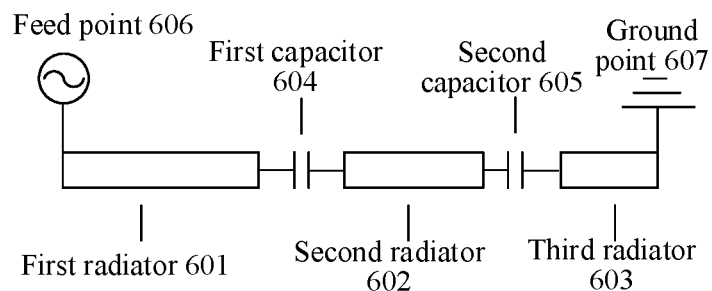
FIG. 6 is a schematic diagram of another terminal antenna according to an embodiment of this application.

When n=3, a structure of the terminal antenna shown in FIG. 5 may be shown in FIG. 6.

FIG. 6 is a schematic diagram of another terminal antenna according to an embodiment of this application. As shown in FIG. 6, the terminal antenna includes a first radiator 601, a second radiator 602, and a third radiator 603. The first radiator 601, the second radiator 602, and the third radiator 603 are flake-shaped. One end of the first radiator 601 is connected to the feed point 606, and an end surface of the other end is coupled to the second radiator 602 to form a first capacitor 604. An end surface of an end of the second radiator 602 away from the first radiator 601 is coupled to the third radiator 603 to form a second capacitor 605. An end of the third radiator 603 away from the second radiator 602 is connected to a ground point 607.

Lengths of the first radiator 601, the second radiator 602, and the third radiator 603 form a descending arithmetic progression. A capacitance value of the first capacitor 604 is greater than a capacitance value of the second capacitor 605.

In other words, if the length of the first radiator 601 is a L1, the length of the second radiator 602 is a L2, and the length of the third radiator 603 is a L3, L1, L2, and L3 satisfy the following formula (4).

$$L1 - L2 = L2 - L3. \qquad \text{Formula (4)}$$

Figure 7:
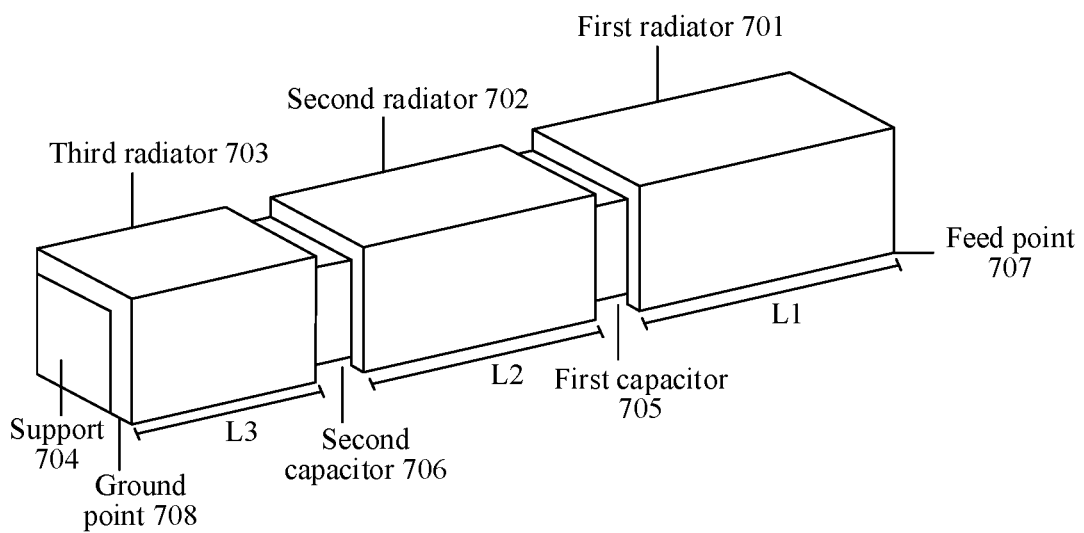
FIG. 7 is a three-dimensional schematic structural diagram of a terminal antenna according to an embodiment of this application.

As an example, the terminal antenna shown in FIG. 6 may have a three-dimensional structure shown in FIG. 7. FIG. 7 is a three-dimensional schematic structural diagram of a terminal antenna according to an embodiment of this application. As shown in FIG. 7, a first radiator 701, a second radiator 702, and a third radiator 703 of the terminal antenna each are a copper foil in an inverted L-shape, and the terminal antenna further includes a columnar support 704. The radiators are arranged on the columnar support 704, and recessed surfaces of the radiators are attached to a side surface of the columnar support 704.

As shown in FIG. 7, an end surface of an end of the first radiator 701 is coupled to the second radiator 702 to form a distributed capacitor, which is referred to as a first capacitor 705. An end surface of an end of the second radiator 702 away from the first radiator 701 is coupled to the third radiator 703 to form a distributed capacitor, which is referred to as a second capacitor 706. A capacitance value of the first capacitor 705 is greater than a capacitance value of the second capacitor 706. Lengths of the first radiator 701, the second radiator 702, and the third radiator 703 form a descending arithmetic progression.

The first radiator 701 is connected to a feed point 707, and the third radiator 703 is connected to a ground point 708.

In some embodiments, the radiators may be copper foils, steel sheets, metal frames, or the like manufactured based on an FPC (Flexible Printed Circuit Board, flexible printed circuit board), LDS (Laser Direct Structuring, laser direct structuring), or MDA (Metalframe Diecasting for Anodization, metalframe diecasting for anodization).

The terminal antenna provided in this embodiment of this application has a relatively high radiation efficiency. The conclusion is verified below through a simulation experiment.

It should be noted that, the following simulation experiment adopt variable control. When the first capacitor and the second capacitor in the terminal antenna are the same, the length of each radiator is adjusted to determine length distribution of the radiators when the radiation efficiency of the terminal antenna is relatively high. When the lengths of the radiators in the terminal antenna are the same, the capacitance value of each capacitor is adjusted to determine capacitance value distribution of the capacitors when the radiation efficiency of the terminal antenna is relatively high.

When the first capacitor and the second capacitor are the same, and the lengths of the radiators from the feed point to the ground point form a descending arithmetic progression, the radiation efficiency of the corresponding terminal antenna is relatively high.

The following simulation experiment includes a first antenna, a second antenna, and a third antenna.

A structure of the first antenna is the same as that of the terminal antenna shown in FIG. 7, except that capacitance values of a first capacitor and a second capacitor in the first antenna are both 0.63 pF.

In addition, in the first antenna, a length of a first radiator is 10 mm, a length of a second radiator is 9 mm, and a length of a third radiator is 8 mm. A distance between the first radiator and the second radiator is 2 mm. A distance between the second radiator and the third radiator is 2 mm. A size of a rear cover of a mobile phone is 245 mm×155 mm. A width of a clearance area of the terminal antenna is 1.5 mm. A width of a side elevation of each radiator is 4 mm.

A structure of the second antenna is similar to that of the first antenna, except that in the second antenna, lengths of a first radiator, a second radiator, and a third radiator are all 9 mm.

A structure of the third antenna is similar to that of the first antenna, except that in the third antenna, a length of a first radiator is 8 mm, a length of a second radiator is 9 mm, and a length of a third radiator is 10 mm.

It may be learned that a total radiator length of the first antenna, a total radiator length of the second antenna, and a total radiator length of the third antenna are equal. In addition, the lengths of the radiators from a feed point of the first antenna to a ground point thereof form a descending arithmetic progression. The lengths of the radiators from a feed point of the second antenna to a ground point thereof are equal to each other. The lengths of the radiators from a feed point of the third antenna to a ground point thereof form an ascending arithmetic progression.

Figure 8:
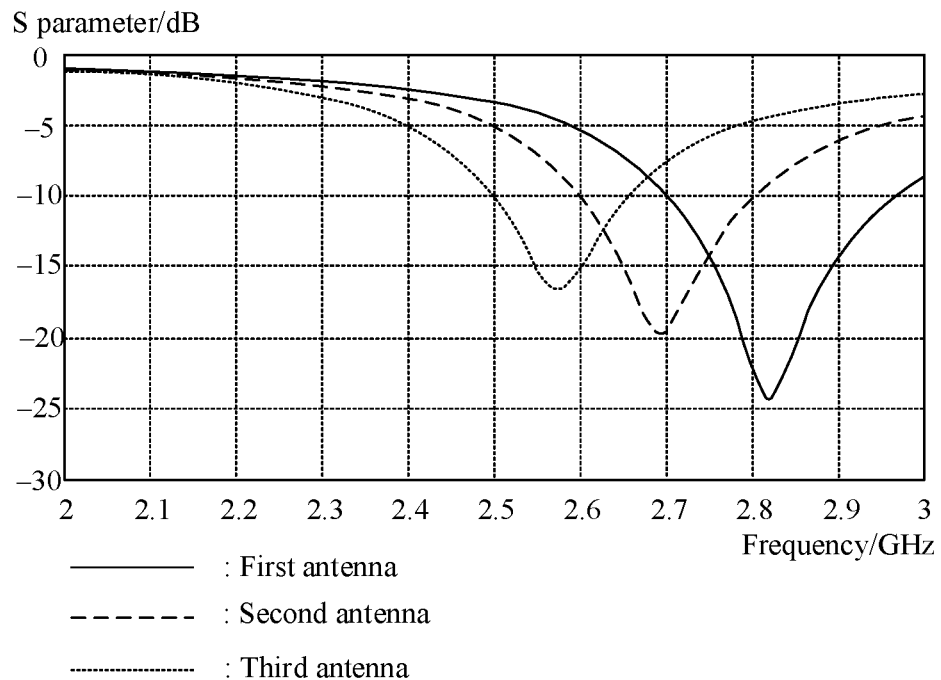
FIG. 8 is a schematic diagram of a curve S11 of a terminal antenna according to an embodiment of this application.

FIG. 8 is a schematic diagram of a curve S11 of a terminal antenna according to an embodiment of this application. The curve S11 of the terminal antenna is used to represent characteristics of the antenna such as a resonant frequency and a return loss.

It may be learned from the curve S11 of each terminal antenna in FIG. 8 that, a resonant frequency of a first antenna is 2.82 GHz, a resonant frequency of a second antenna is 2.69 GHz, and a resonant frequency of a third antenna is 2.57 GHz. That is to say, the resonant frequency of the first antenna is greater than the resonant frequency of the second antenna, and the resonant frequency of the second antenna is greater than the resonant frequency of the third antenna.

In other words, when the lengths of the radiators between the feed point and the ground point are the same, if a length of a radiator close to the feed point is increased and a length of a radiator close to the ground point is reduced so that the lengths of the radiators between the feed point and the ground point form a descending arithmetic progression, the resonant frequency of the terminal antenna deviates to a high frequency. If the length of the radiator close to the feed point is reduced and the length of the radiator close to the ground point is increased so that the lengths of the radiators between the feed point and the ground point form an ascending arithmetic progression, the resonant frequency of the terminal antenna deviates to a low frequency.

Figure 9:
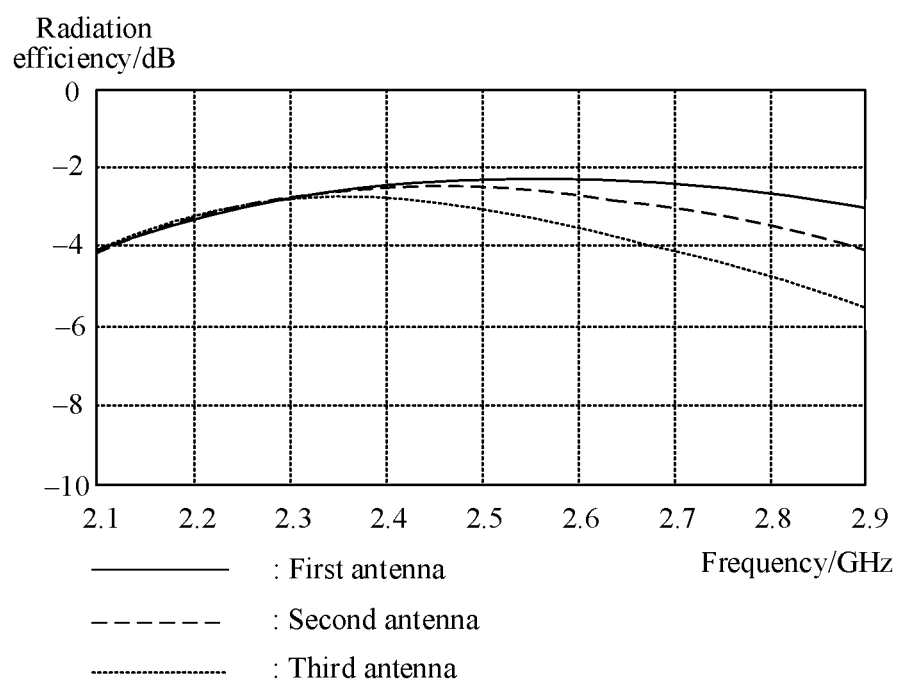
FIG. 9 is a schematic diagram of a radiation efficiency of a terminal antenna according to an embodiment of this application.

FIG. 9 is a schematic diagram of a radiation efficiency of a terminal antenna according to an embodiment of this application.

It may be learned from the radiation efficiency curve of each terminal antenna in FIG. 9 that a radiation efficiency of a first antenna is greater than a radiation efficiency of a second antenna, and the radiation efficiency of the second antenna is greater than a radiation efficiency of a third antenna. That is to say, the terminal antenna has a maximum radiation efficiency when the lengths of the radiators from a feed point to a ground point form a descending arithmetic progression.

In further explanation, a first capacitor and a second capacitor in each of the first antenna, the second antenna, and the third antenna are adjusted. Peak radiation efficiencies of the terminal antennas are adjusted to a same frequency band for comparison. After adjustment, the first capacitor and the second capacitor in the first antenna are both 0.72 pF, the first capacitor and the second capacitor in the second antenna are both 0.63 pF, and the first capacitor and the second capacitor in the third antenna are both 0.5 pF.

Figure 10:
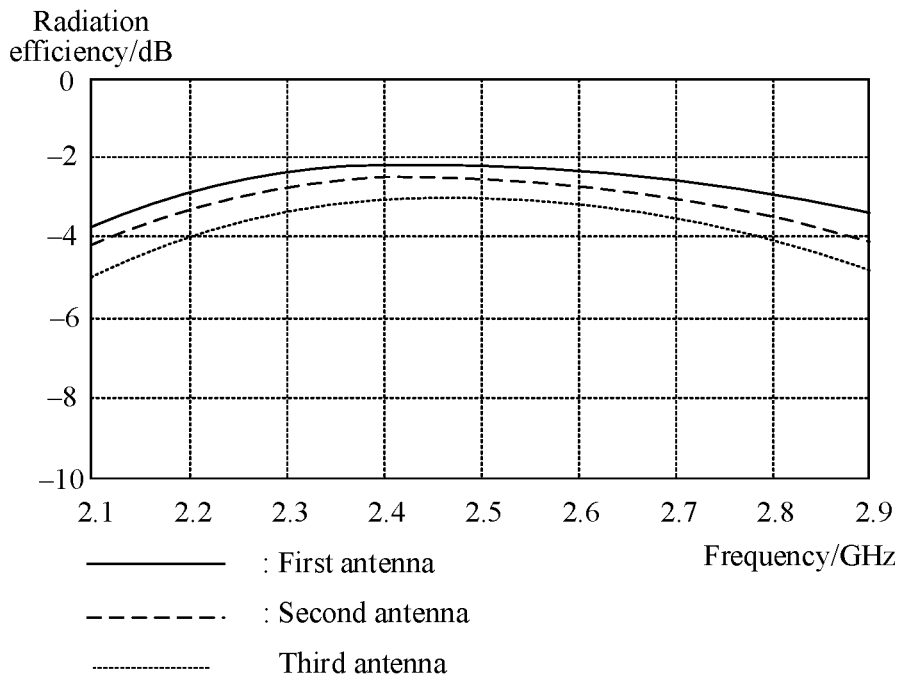
FIG. 10 is a schematic diagram of a radiation efficiency of another terminal antenna according to an embodiment of this application.

FIG. 10 is a schematic diagram of a radiation efficiency of another terminal antenna according to an embodiment of this application.

It may be learned from the radiation efficiency curve of each terminal antenna in FIG. 10 that a radiation efficiency of a first antenna is greater than a radiation efficiency of a second antenna, and the radiation efficiency of the second antenna is greater than a radiation efficiency of a third antenna. That is to say, the terminal antenna has a maximum radiation efficiency when the lengths of the radiators from a feed point to a ground point form a descending arithmetic progression. A same conclusion as that obtained from FIG. 9 is obtained.

Therefore, when the lengths of the radiators from the feed point of the terminal antenna to the ground point thereof form a descending arithmetic progression, the corresponding terminal antenna has a maximum radiation efficiency.

It should be noted that, when the lengths of the radiators from the feed point of the terminal antenna to the ground point thereof form a descending arithmetic progression with difference tolerances, the corresponding terminal antenna has a different radiation efficiency.

The conclusion is verified through a simulation of a first antenna, a fourth antenna, and a fifth antenna.

The first antenna is the first antenna defined in a part of the specification corresponding to FIG. 10. That is to say, the length of the first radiator is 10 mm, the length of the second radiator is 9 mm, the length of the third radiator is 8 mm, and the first capacitor and the second capacitor are both 0.72 pF.

The fourth antenna is similar to the first antenna in the part of the specification corresponding to FIG. 10 above, except that in the fourth antenna, the length of a first radiator is 11 mm, and the length of a third radiator is 7 mm. That is to say, lengths of the first radiator, the second radiator, and the third radiator in the fourth antenna form an arithmetic progression with a tolerance of −2. In addition, a first capacitor and a second capacitor in the fourth antenna are both 0.8 pF.

The fifth antenna is similar to the first antenna in the part of specification corresponding to FIG. 10 above, except that in the fifth antenna, a first radiator is 12 mm, and a third radiator is 6 mm. That is to say, lengths of the first radiator, the second radiator, and the third radiator in the fifth antenna form an arithmetic progression with a tolerance of −3. In addition, a first capacitor and a second capacitor in the fourth antenna are both 0.78 pF.

Figure 11:
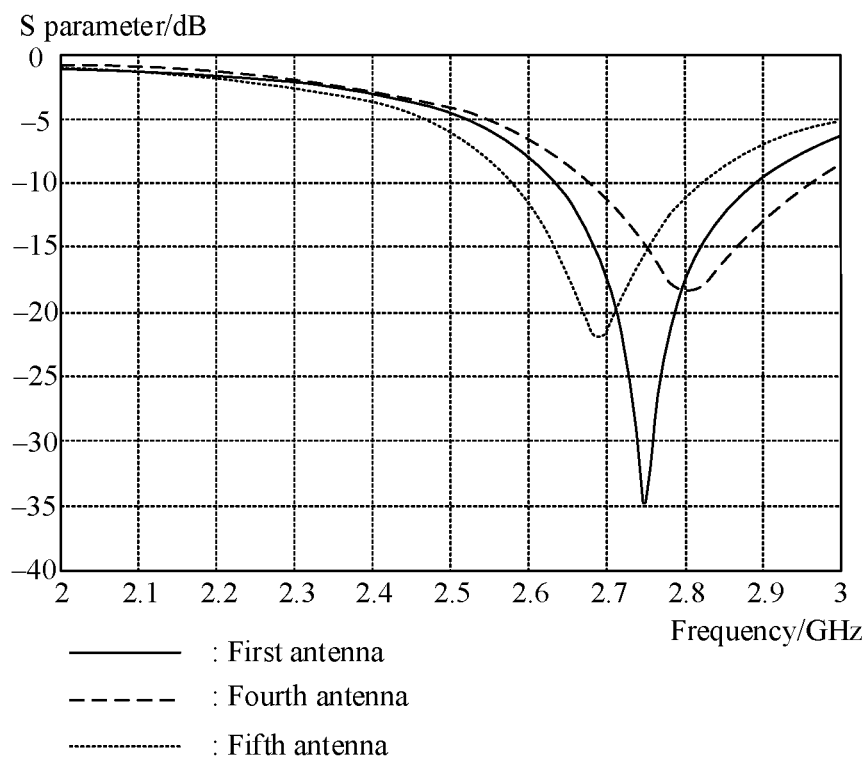
FIG. 11 is a schematic diagram of a curve S11 of the terminal antenna according to an embodiment of this application.

FIG. 11 is a schematic diagram of a curve S11 of the terminal antenna according to an embodiment of this application. As shown in FIG. 11, a resonant frequency of the first antenna is 2.75 GHz, a resonant frequency of the fourth antenna is 2.8 GHZ, and a resonant frequency of the fifth antenna is 2.68 GHz.

That is to say, as a tolerance among the length of the first radiator, the length of the second radiator, and the length of the third radiator in the terminal antenna decreases (an absolute value of the tolerance increases), the resonant frequency of the terminal antenna deviates first to a high frequency and then to a low frequency.

Figure 12:
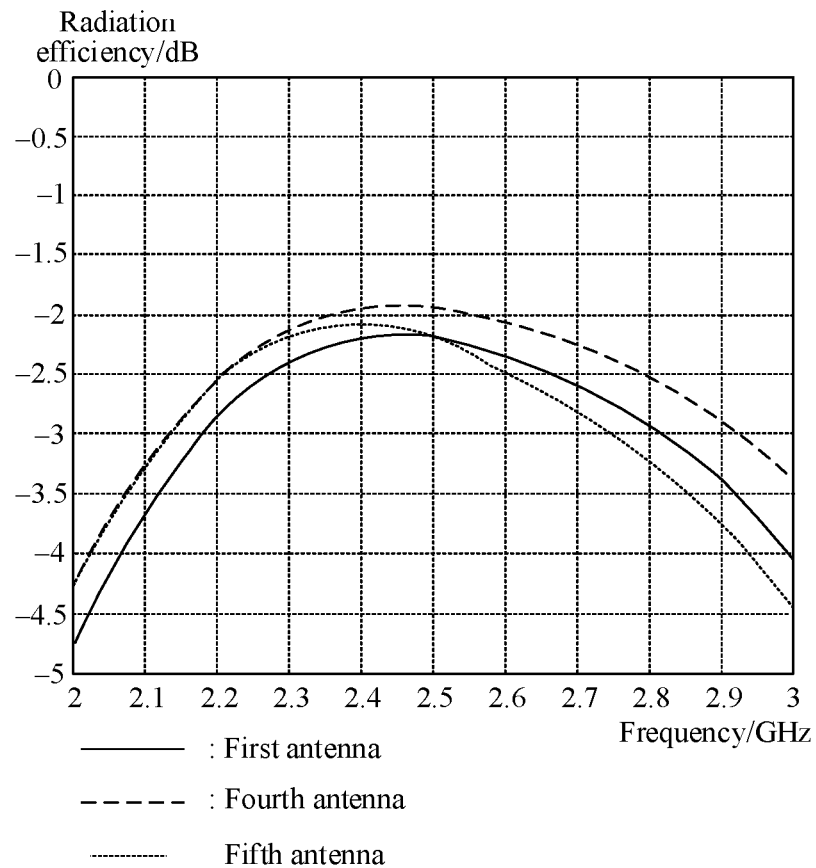
FIG. 12 is a schematic diagram of a radiation efficiency of the terminal antenna according to an embodiment of this application.

Correspondingly, a radiation efficiency of the terminal antenna first increases and then decreases. FIG. 12 is a schematic diagram of a radiation efficiency of the terminal antenna according to an embodiment of this application. As shown in FIG. 12, a radiation efficiency of the fourth antenna is greater than a radiation efficiency of the first antenna, and the radiation efficiency of the first antenna is greater than a radiation efficiency of the fifth antenna.

It may be learned from the radiation efficiency of each terminal antenna in FIG. 12 that, as a tolerance among lengths of the first radiator, the second radiator, and the third radiator in the terminal antenna decreases (an absolute value of the tolerance increases), a peak radiation efficiency of the terminal antenna first increases and then decreases.

It may be understood that when the tolerance among the lengths of the first radiator, the second radiator, and the third radiator decreases to a specific value, the radiation efficiency of the terminal antenna increases to a maximum value.

When the radiation efficiency of the terminal antenna is reaches the maximum value, the tolerance among the lengths of the radiators is a first value.

It may be learned from FIG. 12 that when the tolerance among the lengths of the radiators decreases from 1 mm to 2 mm, the radiation efficiency of the corresponding terminal antenna increases by about 0.3 dB. When the tolerance among the lengths of the radiators decreases from 2 mm to 3 mm, the radiation efficiency of the corresponding terminal antenna decreases by about 0.1 dB.

That is to say, a rate of the increase in the radiation efficiency when the tolerance among the lengths of the radiators is greater than the first value is greater than a rate of the decrease in the radiation efficiency when the tolerance among the lengths of the radiators is less than the first value.

Therefore, if the radiation efficiency of the corresponding terminal antenna when the tolerance among the lengths of the first radiator, the second radiator, and the third radiator is less than 0 is set to P1, and the radiation efficiency of the corresponding terminal antenna when the tolerance among the lengths of the first radiator, the second radiator, and the third radiator is greater than or equal to 0 is set to P2, P1 and P2 satisfy the following formula (5).

$$P1 > P2. \quad \text{Formula (5)}$$

It may be learned from FIG. 8 to FIG. 12 that, when the lengths of the radiators from the feed point to the ground point form a descending arithmetic progression, the corresponding terminal antenna has a relatively high radiation efficiency.

The conclusion may be evidenced by current distribution during operation of the terminal antenna. The conclusion is verified below through a current simulation of the first antenna, the second antenna, and the third antenna corresponding to FIG. 10.

Figure 13:
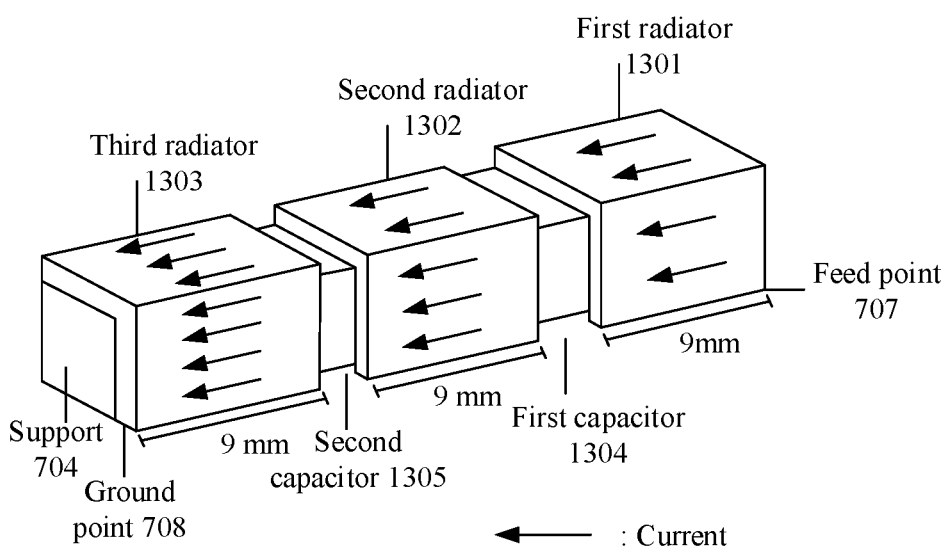
FIG. 13 is a schematic diagram of current distribution of a terminal antenna according to an embodiment of this application.

FIG. 13 is a schematic diagram of current distribution of a terminal antenna according to an embodiment of this application. Specifically, FIG. 13 is a schematic diagram of current distribution of a second antenna. As described above, in the second antenna, lengths of a first radiator 1301, a second radiator 1302, and a third radiator 1303 are all 9 mm, and a first capacitor 1304 and a second capacitor 1305 are both 0.63 pF.

As shown in FIG. 13, during operation of the second antenna, currents are concentrated on a side where a ground point is located.

Figure 14:
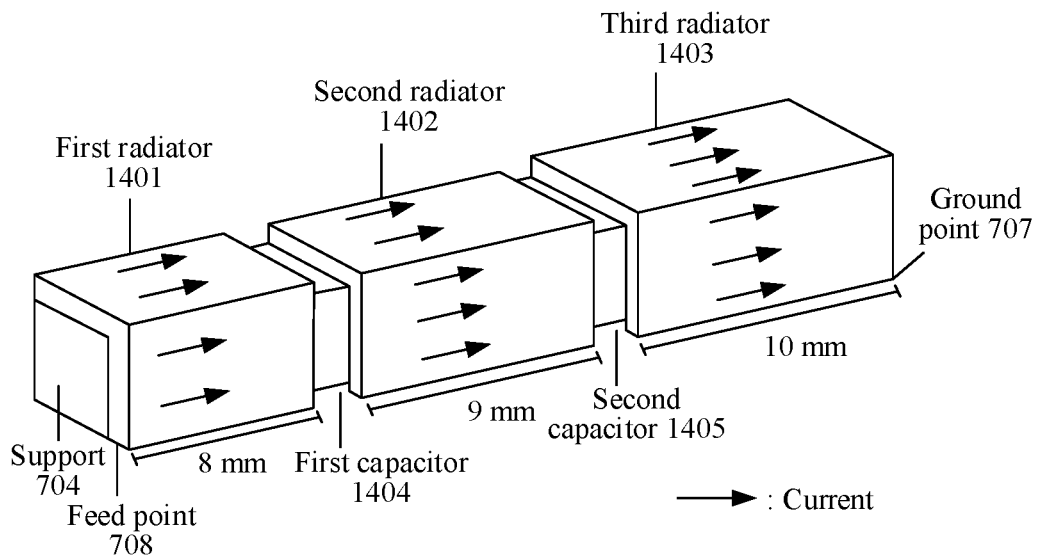
FIG. 14 is a schematic diagram of current distribution of another terminal antenna according to an embodiment of this application.

FIG. 14 is a schematic diagram of current distribution of another terminal antenna according to an embodiment of this application. Specifically, FIG. 14 is a schematic diagram of current distribution of a third antenna. As described above, in the third antenna, a length of a first radiator 1401 is 8 mm, a length of a second radiator 1402 is 9 mm, and a length of a third radiator 1403 is 10 mm, and a first capacitor 1404 and a second capacitor 1405 are both 0.5 pF.

As shown in FIG. 14, during operation of the third antenna, currents are concentrated on a side where a ground point is located.

Figure 15:
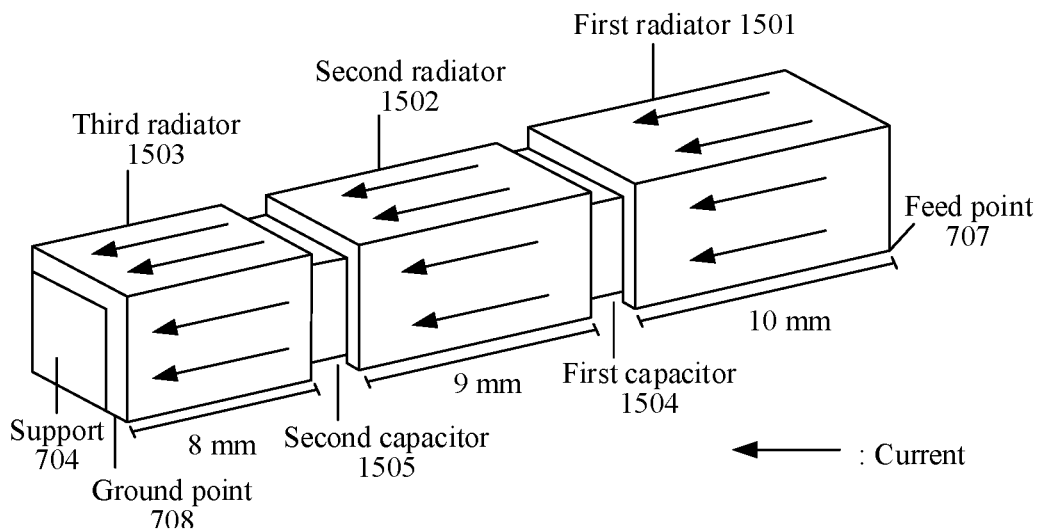
FIG. 15 is a schematic diagram of current distribution of another terminal antenna according to an embodiment of this application.

FIG. 15 is a schematic diagram of current distribution of another terminal antenna according to an embodiment of this application. Specifically, FIG. 15 is a schematic diagram of current distribution of a first antenna. As described above, in the first antenna, a length of a first radiator 1501 is 10 mm, a length of a second radiator 1502 is 9 mm, and a length of a third radiator 1503 is 8 mm, and a first capacitor 1504 and a second capacitor 1505 are both 0.72 pF.

As shown in FIG. 15, during operation of the first antenna, current distribution on the radiators is relatively uniform.

A more non-uniform current distribution on the radiators indicates a larger power loss, and indicates a lower radiation efficiency of the corresponding terminal antenna. Therefore, when the lengths of the radiators from the feed point to the ground point thereof form a descending arithmetic progression, the corresponding terminal antenna has a relatively high radiation efficiency.

The following simulation experiment is used to demonstrate that the corresponding terminal antenna has a relatively high radiation efficiency when the lengths of the radiators are the same and the capacitance values of the capacitors from the feed point to the ground point are distributed in descending order.

The following simulation experiment includes a sixth antenna, a seventh antenna, and an eighth antenna.

A structure of the sixth antenna is similar to that of the first antenna, except that in the sixth antenna, lengths of a first radiator, a second radiator, and a third radiator are all 9 mm, a capacitance value of a first capacitor is 0.3 pF, and a capacitance value of a second capacitor is 0.9 pF.

A structure of the seventh antenna is similar to that of the first antenna, except that in the seventh antenna, lengths of a first radiator, a second radiator, and a third radiator are all 9 mm, and capacitance values of a first capacitor and a second capacitor are both 0.63 pF.

A structure of the eighth antenna is similar to that of the first antenna, except that in the eighth antenna, lengths of a first radiator, a second radiator, and a third radiator are all 9 mm, a capacitance value of a first capacitor is 1 pF, and a capacitance value of a second capacitor is 0.45 pF.

Figure 16:
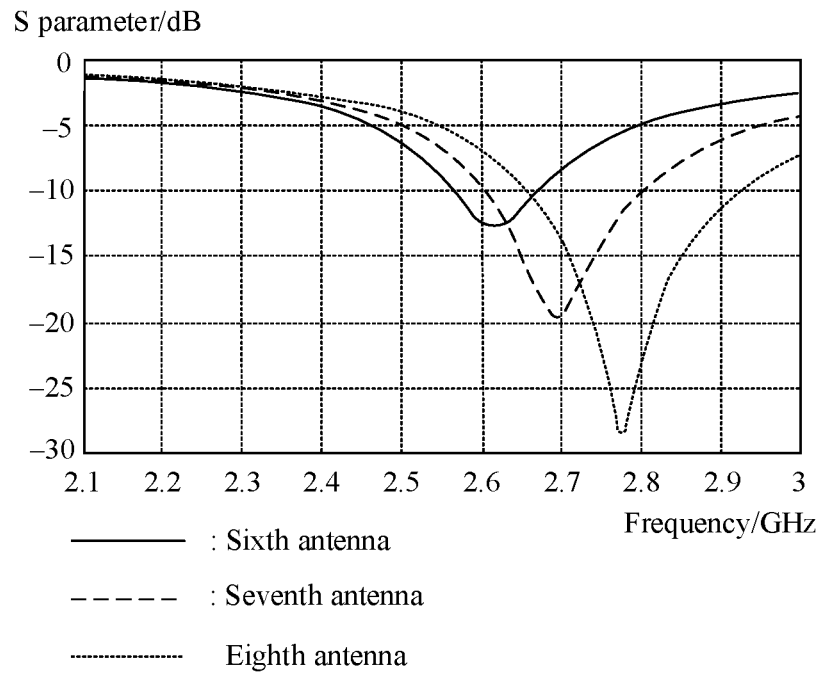
FIG. 16 is a schematic diagram of a curve S11 of a terminal antenna according to an embodiment of this application.

FIG. 16 is a schematic diagram of a curve S11 of the terminal antenna according to an embodiment of this application. As shown in FIG. 16, a resonant frequency of the sixth antenna is less than a resonant frequency of the seventh antenna, and the resonant frequency of the seventh antenna is less than a resonant frequency of the eighth antenna.

That is to say, during variation of a difference between the capacitance values of the first capacitor and the second capacitor from a negative value to a positive value, the resonant frequency of the corresponding terminal antenna gradually deviates to a high frequency.

Figure 17:
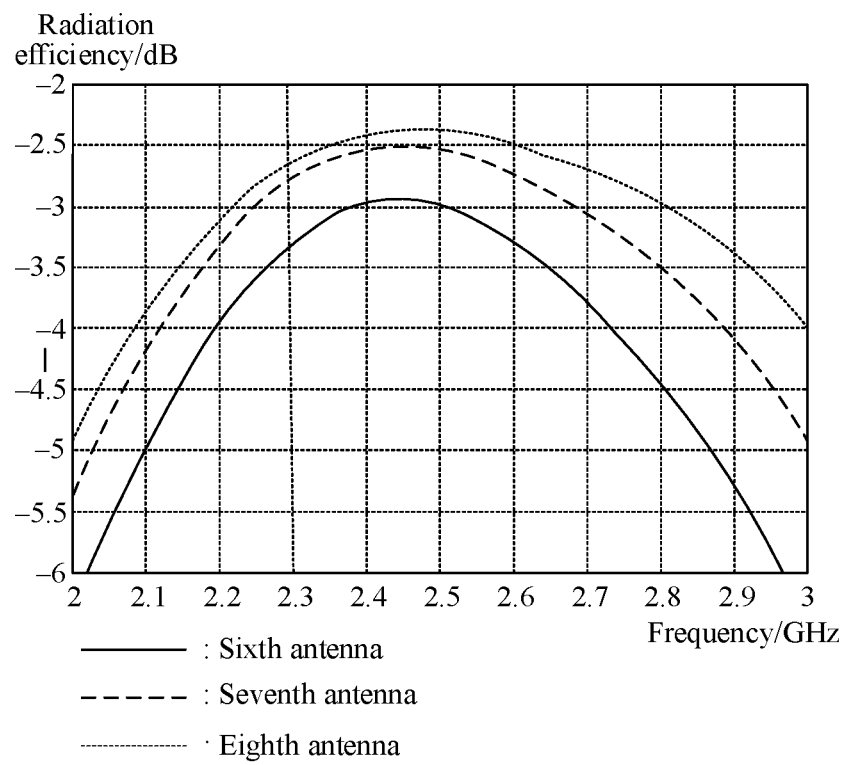
FIG. 17 is a schematic diagram of a radiation efficiency of the terminal antenna according to an embodiment of this application.

FIG. 17 is a schematic diagram of a radiation efficiency of the terminal antenna according to an embodiment of this application. As shown in FIG. 17, a radiation efficiency of the sixth antenna is less than a radiation efficiency of the seventh antenna, and the radiation efficiency of the seventh antenna is less than a radiation efficiency of the eighth antenna.

That is to say, during variation of a difference between the capacitance values of the first capacitor and the second capacitor from a negative value to a positive value, the radiation efficiency of the corresponding terminal antenna gradually increases.

Therefore, when the capacitance value of the first capacitor is greater than the capacitance value of the second capacitor, the corresponding terminal antenna has a relatively high radiation efficiency.

When the difference between the capacitance values of the first capacitor and the second capacitor further increases, the radiation efficiency of the corresponding terminal antenna first increases and then decreases. The conclusion may be evidenced through a simulation experiment. The following simulation experiment includes an eighth antenna, a ninth antenna, and a tenth antenna.

As mentioned above, a structure of the eighth antenna is similar to that of the first antenna, except that in the eighth antenna, lengths of a first radiator, a second radiator, and a third radiator are all 9 mm, a capacitance value of a first capacitor is 1 pF, and a capacitance value of a second capacitor is 0.45 pF.

A structure of the ninth antenna is similar to that of the first antenna, except that in the ninth antenna, lengths of a first radiator, a second radiator, and a third radiator are all 9 mm, a capacitance value of a first capacitor is 1.2 pF, and a capacitance value of a second capacitor is 0.4 pF.

A structure of the tenth antenna is similar to that of the first antenna, except that in the tenth antenna, lengths of a first radiator, a second radiator, and a third radiator are all 9 mm, a capacitance value of a first capacitor is 1.5 pF, and a capacitance value of a second capacitor is 0.35 pF.

Figure 18:
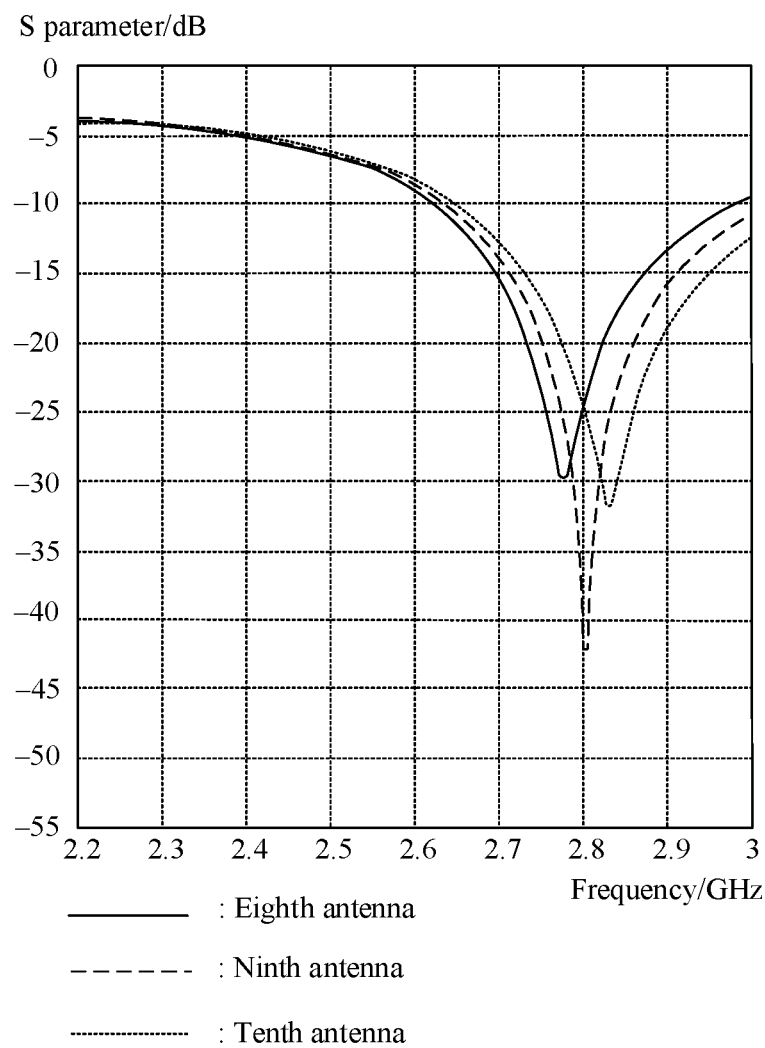
FIG. 18 is a schematic diagram of a curve S11 of a terminal antenna according to an embodiment of this application.

FIG. 18 is a schematic diagram of a curve S11 of a terminal antenna according to an embodiment of this application. As shown in FIG. 18, a resonant frequency of the eighth antenna is less than a resonant frequency of the ninth antenna, and the resonant frequency of the ninth antenna is less than a resonant frequency of the tenth antenna.

That is to say, when the capacitance value of the first capacitor is greater than the capacitance value of the second capacitor, as the difference between the capacitance values of the first capacitor and the second capacitor increases, the resonant frequency of the corresponding terminal antenna deviates to a high frequency.

Figure 19:
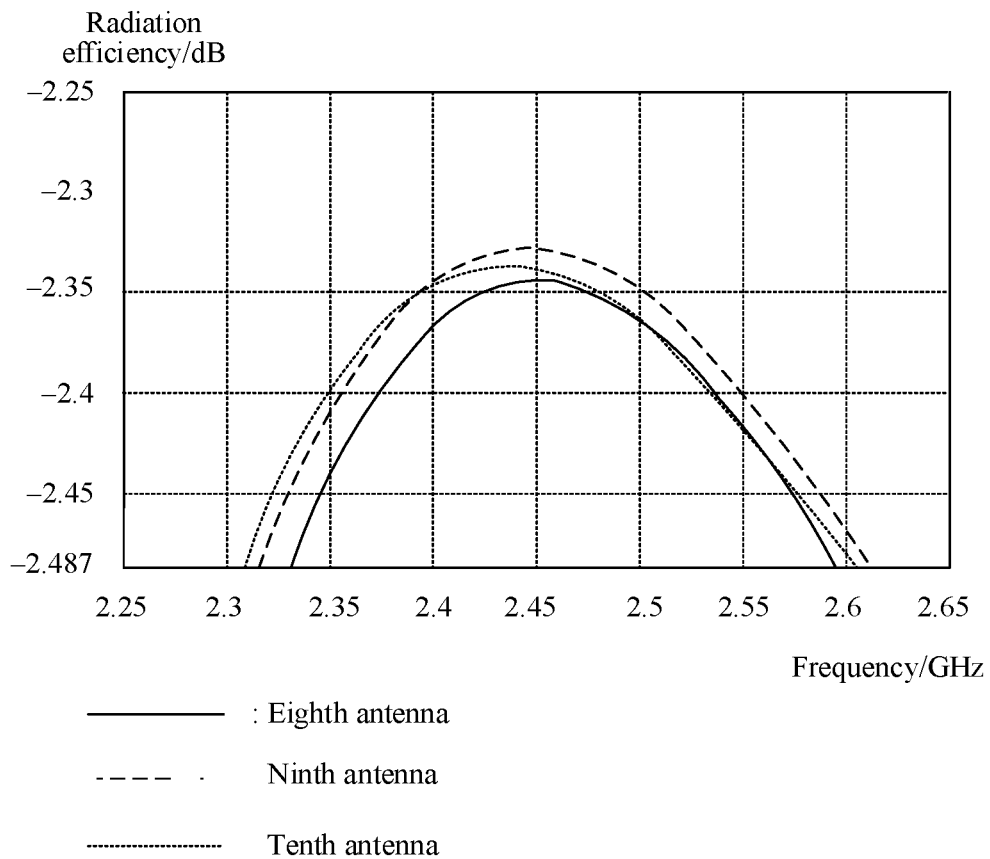
FIG. 19 is a schematic diagram of a radiation efficiency of the terminal antenna according to an embodiment of this application.

FIG. 19 is a schematic diagram of a radiation efficiency of the terminal antenna according to an embodiment of this application. As shown in FIG. 19, a radiation efficiency of the eighth antenna is less than a radiation efficiency of the ninth antenna, and the radiation efficiency of the ninth antenna is less than a radiation efficiency of the tenth antenna.

That is to say, when the capacitance value of the first capacitor is greater than the capacitance value of the second capacitor, as the difference between the capacitance values of the first capacitor and the second capacitor increases, the radiation efficiency of the corresponding terminal antenna first increases and then decreases.

It may be understood that when the difference between the capacitance values of the first capacitor and the second capacitor increases to a specific value, the radiation efficiency of the terminal antenna increases to a maximum value.

The difference between the capacitance values of the first capacitor and the second capacitor when terminal antenna has a maximum radiation efficiency is referred to as a second value.

It may be learned from FIG. 19 that when the difference between the capacitance values of the first capacitor and the second capacitor increases from the 0.55 pF to 0.8 pF, the radiation efficiency of the corresponding terminal antenna increases by about 0.02 dB. When a tolerance among the lengths of the radiators increases from 0.8 pF to 1.15 pF, the radiation efficiency of the corresponding terminal antenna decreases by about 0.01 dB.

That is to say, a rate of the increase in the radiation efficiency when the difference between the capacitance values of the first capacitor and the second capacitor is less than the second value is greater than a rate of the decrease in the radiation efficiency when the difference between the capacitance values of the first capacitor and the second capacitor is greater than the second value.

Therefore, if the radiation efficiency of the corresponding terminal antenna when the difference between the capacitance values of the first capacitor and the second capacitor is greater than 0 is set to P3, and the radiation efficiency of the corresponding terminal antenna when the difference between the capacitance values of the first capacitor and the second capacitor is less than or equal to 0 is set to P4, P3 and P4 satisfy the following formula (6).

$$P3 > P4. \qquad \text{Formula (6)}$$

In addition, it may be learned from FIG. 19 that a change in the radiation efficiency of the terminal antenna resulted from changes in the first capacitor and the second capacitor is less than a change in the radiation efficiency of the terminal antenna resulted from changes in the lengths of the radiators.

It may be learned from FIG. 16 to FIG. 19 that when the capacitors are distributed in descending order from the feed point to the ground point, the corresponding terminal antenna has a relatively high radiation efficiency.

The conclusion may be evidenced by current distribution during operation of the terminal antenna. The conclusion is verified below through a current simulation of the sixth antenna, the seventh antenna, and the eighth antenna corresponding to FIG. 17.

Figure 20:
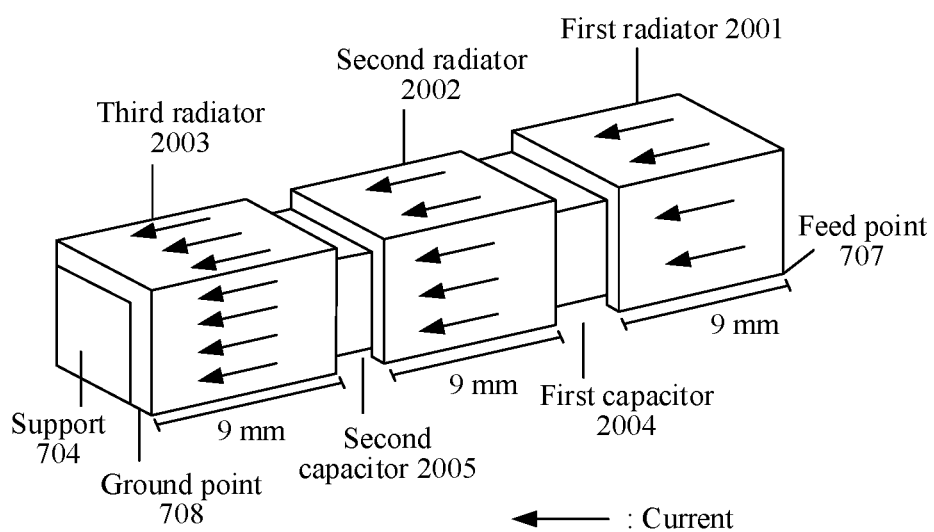
FIG. 20 is a schematic diagram of current distribution of a terminal antenna according to an embodiment of this application.

FIG. 20 is a schematic diagram of current distribution of a terminal antenna according to an embodiment of this application. Specifically, FIG. 20 is a schematic diagram of current distribution of a sixth antenna. As described above, in the second antenna, lengths of a first radiator 2001, a second radiator 2002, and a third radiator 2003 are all 9 mm, a capacitance value of a first capacitor 2004 is 0.3 pF, and a capacitance value of a second capacitor 2005 is 0.9 pF.

As shown in FIG. 20, during operation of the sixth antenna, currents are concentrated on a side where a ground point is located.

Figure 21:
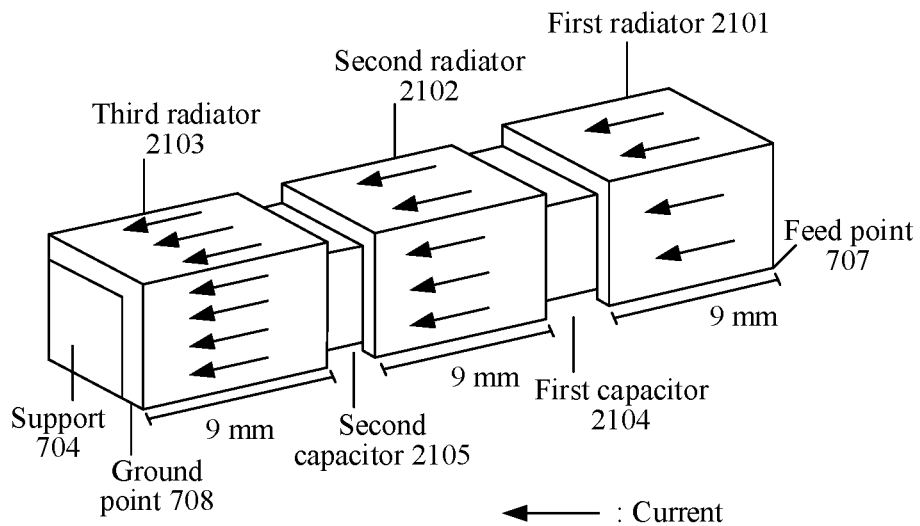
FIG. 21 is a schematic diagram of current distribution of another terminal antenna according to an embodiment of this application.

FIG. 21 is a schematic diagram of current distribution of another terminal antenna according to an embodiment of this application. Specifically, FIG. 21 is a schematic diagram of current distribution of a seventh antenna. As described above, in the seventh antenna, lengths of a first radiator 2101, a second radiator 2102, and a third radiator 2103 are all 9 mm, and capacitance values of a first capacitor 2104 and a second capacitor 2105 are both 0.63 pF.

As shown in FIG. 21, during operation of the seventh antenna, currents are concentrated on a side where a ground point is located.

Figure 22:
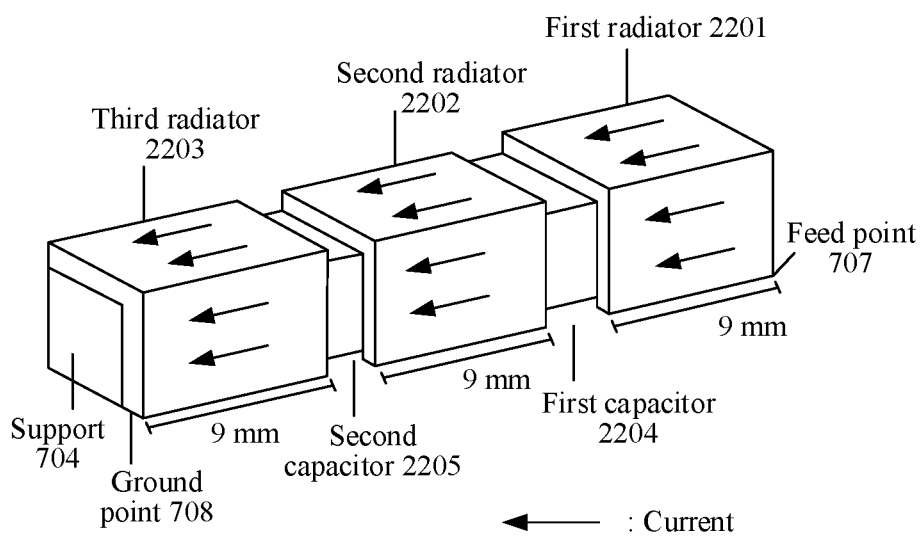
FIG. 22 is a schematic diagram of current distribution of another terminal antenna according to an embodiment of this application.

FIG. 22 is a schematic diagram of current distribution of another terminal antenna according to an embodiment of this application. Specifically, FIG. 22 is a schematic diagram of current distribution of an eighth antenna. As described above, in the eighth antenna, lengths of a first radiator 2201, a second radiator 2202, and a third radiator 2203 are all 9 mm, a capacitance value of a first capacitor 2204 is 1 pF, and a capacitance value of a second capacitor 2205 is 0.45 pF.

As shown in FIG. 22, during operation of the eighth antenna, current distribution on the radiators is relatively uniform.

A more non-uniform current distribution on the radiators indicates a larger power loss, and indicates a lower radiation efficiency of the corresponding terminal antenna. Therefore, when the capacitance values of the capacitors from a feed point to a ground point successively decrease, the corresponding terminal antenna has a relatively high radiation efficiency.

In the terminal antenna provided in this embodiment of the application, from the feed point to the ground point, the lengths of the radiators form a descending arithmetic progression, and the capacitance values of the capacitors successively decrease. It may be learned from the simulations in FIG. 8 to FIG. 22 that the antenna provided in this embodiment of this application has a relatively high radiation efficiency.

In some embodiments, thicknesses of the radiators in the terminal antenna may be 0.05 mm, which facilitates miniaturization of the terminal antenna.

However, when the thicknesses of the radiators are relatively small, capacitance values of distributed capacitors formed between the radiators may be excessively small, failing in meeting required capacitance values of the capacitors in the terminal antenna.

Figure 23:
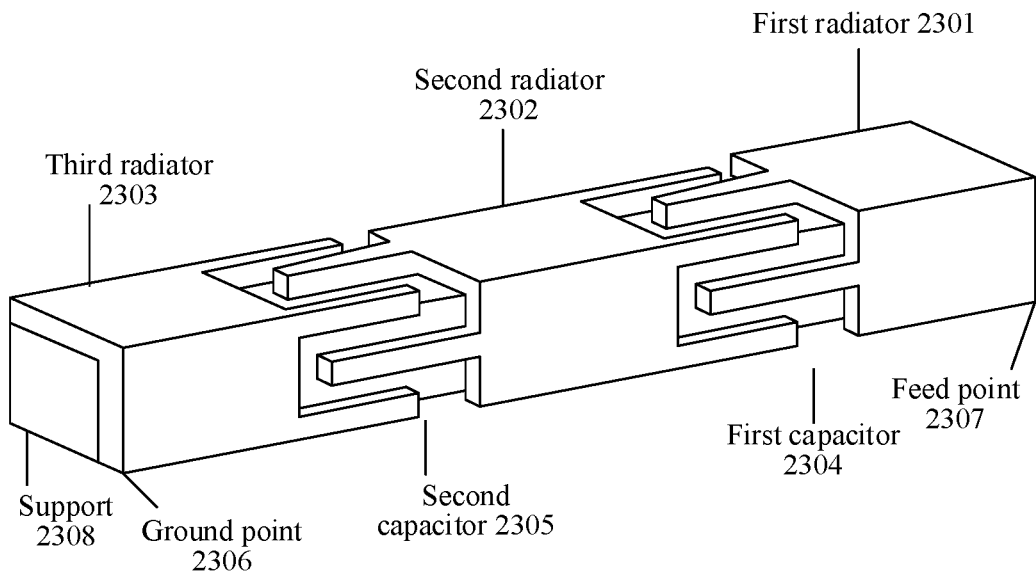
FIG. 23 is a schematic diagram of another terminal antenna according to an embodiment of this application.

In this embodiment of this application, adjacent radiators may be interdigitally coupled to each other to form the distributed capacitors. FIG. 23 is a schematic diagram of another terminal antenna according to an embodiment of this application. As shown in FIG. 23, the terminal antenna includes a first radiator 2301, a second radiator 2302, and a third radiator 2303. The first radiator 2301, the second radiator 2302, and the third radiator 2303 are arranged on a support 2308 in sequence. Lengths of the first radiator 2301, the second radiator 2302, and the third radiator 2303 form a descending arithmetic progression. The first radiator 2301 is interdigitally coupled to the second radiator 2302 to form a first capacitor 2304. The second radiator 2302 is interdigitally coupled to the third radiator 2303 to form a second capacitor 2305. The first capacitor 2304 is greater than the second capacitor 2305. The third radiator 2303 is connected to a ground point 2306, and the first radiator 2301 is connected to a feed point 2307.

As shown in FIG. 23, interdigital coupling is a way to interdigitate a plurality of protrusions provided on an end of one radiator and a plurality of protrusions provided on an opposite end of another radiator to form a distributed capacitor.

It may be learned that compared to the coupling manner shown in FIG. 7, the coupling manner shown in FIG. 23 can increase a relative area between adjacent radiators, thereby increasing the capacitance values of the distributed capacitors formed between adjacent radiators.

It is easily understood that the capacitance values of the distributed capacitors formed between adjacent radiators may be adjusted by adjusting a number of the interdigital couplings between adjacent radiators, to meet requirements of the terminal antenna for the capacitance values of the capacitors.

In addition, suspended copper foils may be arranged at interdigital coupled positions of adjacent radiators to further increase a coupling amount between the radiators.

Figure 24:
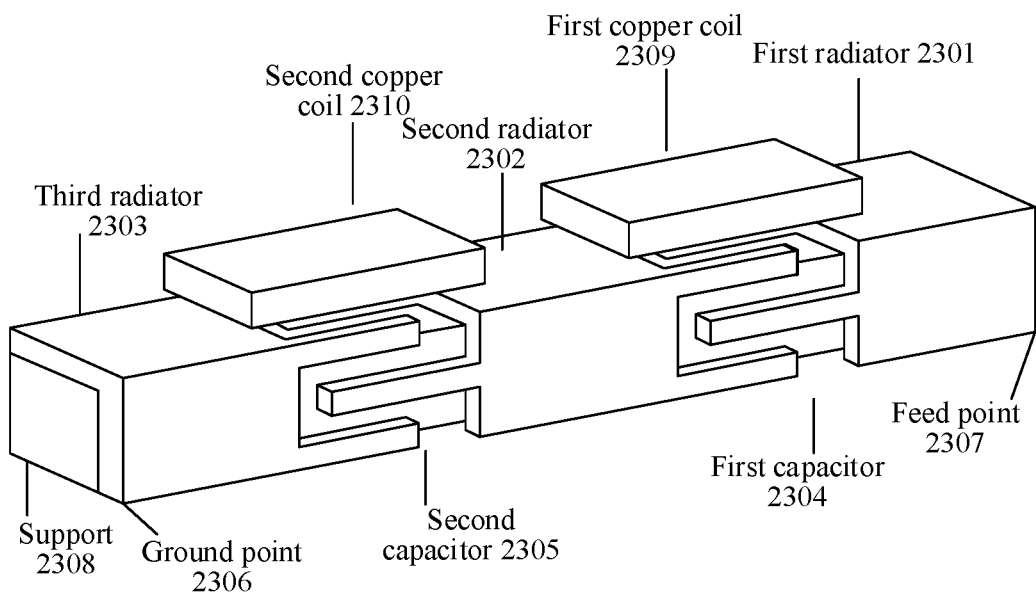
FIG. 24 is a schematic diagram of another terminal antenna according to an embodiment of this application.

FIG. 24 is a schematic diagram of another terminal antenna according to an embodiment of this application. As shown in FIG. 24, in the terminal antenna, a length of a first radiator 2301 is 14.7 mm, a length of a second radiator 2302 is 12.65 mm, and a length of a third radiator 2303 is 10.6 mm. A length of a first copper foil 2309 may be 4.9 mm, and a width thereof may be 2.8 mm. A length of a second copper foil 2310 may be 2.8 mm, and a width thereof may be 1.9 mm. The first copper foil 2309 is a copper foil suspended at a coupled position between the first radiator 2301 and the second radiator 2302. The second copper foil 2310 is a copper foil suspended at a coupled position between the second radiator 2302 and the third radiator 2303. A vertical distance between the first copper foil 2309 and the coupled position between the first radiator 2301 and the second radiator 2302 is the same as a vertical distance between the second copper foil 2310 and the coupled position between the first radiator 2301 and the second radiator 2302.

The first copper foil 2309 may form a capacitor with the first radiator 2301 and the second radiator 2302 respectively, thereby increasing a coupling amount of the first radiator 2301 and the second radiator 2302. Similarly, the second copper foil 2310 may form a capacitor with the second radiator 2302 and the third radiator 2303 respectively, thereby increasing a coupling amount of the second radiator 2302 and the third radiator 2303.

It may be understood that a relative area between the first copper foil 2309 and the coupled position between the first radiator 2301 and the second radiator 2302 is relatively large and a relative area between the second copper foil 2310 and the coupled position between the second radiator 2302 and the third radiator 2303 is relatively small. Therefore, an increase amount of the first capacitor 2304 is greater than an increase amount of the second capacitor 2305.

In some embodiments, the copper foil may be made based on an FPC, an LDS, or an MDA. This is not specifically limited in this application.

It may be learned from FIG. 23 to FIG. 24 that in the terminal antenna provided in this embodiment of this application, adjacent radiators may be interdigitally coupled to each other, and the suspended copper foil may be arranged at the position of interdigital coupling, to increase the coupling amount of adjacent radiators, thereby improving a radiation efficiency of the terminal antenna.

In addition, it should be noted that, for the terminal antennas provided in FIG. 5, a terminal antenna in which the length of the radiator connected to the feed point is greater than the lengths of other radiators has a larger radiation efficiency than a terminal in which the radiators have an equal length. In other words, for the terminal antenna in which the radiators have an equal length, the radiation efficiency of the corresponding terminal antenna increases when the length of the radiator connected to the feed point increases.

An embodiment of this application further provides a terminal antenna. The terminal antenna includes m radiators. The m radiators are B1, B2, B3, . . . , Bm. m is an integer greater than or equal to 3. An end surface of an end of Bj is coupled to B (j−1) to form a distributed capacitor D (j−1). An end surface of the other end of Bj is coupled to B (j+1) to form a distributed capacitor Dj. j is an integer greater than or equal to 2 and less than or equal to m−1. An end of B1 away from B2 is connected to a feed point, and an end of the Bm away from B (m−1) is connected to a ground point. A length of B1 is greater than lengths of other radiators, and a capacitance value of D1 is greater than capacitance values of other distributed capacitors.

In this way, current distribution on the radiators of the terminal antenna is relatively uniform, which can effectively reduce a current loss, thereby improving a radiation efficiency of the terminal antenna.

Although this application is described with reference to specific features and the embodiments thereof, apparently, various modifications and combinations may be made to this application without departing from the spirit and scope of this application. Correspondingly, the specification and the accompanying drawings are merely an example description of this application defined by the following claims, and are deemed to have covered any and all modifications, variations, combinations, or equivalents that fall within the scope of this application. Obviously, a person skilled in the art may make various modifications and variations to this application without departing from the spirit and scope of this application. In this case, if the modifications and the variations made to this application fall within the scope of the claims of this application and equivalent technologies thereof, this application is intended to include these modifications and variations.

What is claimed is:

1. A terminal antenna, comprising n radiators, wherein the n radiators comprise a first radiator, a second radiator, and a third radiator, and wherein:

lengths of the first radiator, the second radiator, and the third radiator form a descending arithmetic progression;

the first radiator, the second radiator, and the third radiator are arranged in sequence, a first gap is between the first radiator and the second radiator, and a second gap is between the second radiator and the third radiator;

a first coupling capacitance formed by the first radiator and the second radiator through the first gap is greater than a second coupling capacitance formed by the second radiator and the third radiator through the second gap;

the first radiator, the second radiator, and the third radiator are any three of the n radiators distributed in sequence; and a first end of the terminal antenna is connected to a ground point, a second end of the terminal antenna is connected to a feed point, a radiator connected to the ground point is a shortest radiator of the n radiators, and a radiator connected to the feed point is a longest radiator of the n radiators.

2. The terminal antenna according to claim 1, further comprising a columnar support, wherein the first radiator, the second radiator, and the third radiator each are a copper foil and in an inverted L-shape, and are arranged on a side surface of the columnar support in sequence.

3. The terminal antenna according to claim 1, wherein the first radiator is interdigitally coupled to the second radiator, and the second radiator is interdigitally coupled to the third radiator.

4. The terminal antenna according to claim 1, wherein a suspended copper foil is arranged at each of a coupled position between the first radiator and the second radiator and a coupled position between the second radiator and the third radiator;

wherein the coupled position between the first radiator and the second radiator and the corresponding suspended copper foil form a third coupling capacitance; and wherein the coupled position between the second radiator and the third radiator and the corresponding suspended copper foil form a fourth coupling capacitance.

5. The terminal antenna according to claim 4, wherein n=3, and wherein:

a total coupling capacitance between the first radiator and the second radiator is 1 pF, and a total coupling capacitance between the second radiator and the third radiator is 0.45 pF;

the total coupling capacitance between the first radiator and the second radiator comprises the first coupling capacitance between the first radiator and the second radiator and the third coupling capacitance formed by the coupled position between the first radiator and the second radiator and the corresponding suspended copper foil; and the total coupling capacitance between the second radiator and the third radiator comprises the second coupling capacitance between the second radiator and the third radiator and the fourth coupling capacitance formed by the coupled position between the second radiator and the third radiator and the corresponding suspended copper foil.

6. The terminal antenna according to claim 5, wherein the length of the first radiator is 10 mm, the length of the second radiator is 9 mm, and the length of the third radiator is 8 mm.

7. The terminal antenna according to claim 5, wherein the length of the first radiator is 14.7 mm, the length of the second radiator is 13.1 mm, and the length of the third radiator is 10.6 mm.

8. The terminal antenna according to claim 4, wherein a coupling area of the third coupling capacitance formed by the coupled position between the first radiator and the second radiator and the corresponding suspended copper foil is 5.6 mm×2.9 mm; and a coupling area of the fourth coupling capacitance formed by the coupled position between the second radiator and the third radiator and the corresponding suspended copper foil is 2.9 mm×2.9 mm.

9. The terminal antenna according to claim 1, wherein thicknesses of the first radiator, the second radiator, and the third radiator are all 0.05 mm.

10. The terminal antenna according to claim 1, wherein an operating frequency band of the terminal antenna is 2.4 GHz.

11. A terminal antenna, comprising n radiators, wherein the n radiators comprise a first radiator, a second radiator, and a third radiator, and wherein:

lengths of the first radiator, the second radiator, and the third radiator form a descending arithmetic progression;

the first radiator, the second radiator, and the third radiator are arranged in sequence, a first gap is between the first radiator and the second radiator, and a second gap is between the second radiator and the third radiator;

a first coupling capacitance formed by the first radiator and the second radiator through the first gap is greater than a second coupling capacitance formed by the second radiator and the third radiator through the second gap;

the first radiator, the second radiator, and the third radiator are any three of the n radiators distributed in sequence;

a first end of the terminal antenna is connected to a ground point, a second end of the terminal antenna is connected to a feed point, a radiator connected to the ground point is a shortest radiator of the n radiators, and a radiator connected to the feed point is a longest radiator of the n radiators;

a suspended copper foil is arranged at each of a coupled position between the first radiator and the second radiator and a coupled position between the second radiator and the third radiator;

the coupled position between the first radiator and the second radiator and the corresponding suspended copper foil form a third coupling capacitance; and the coupled position between the second radiator and the third radiator and the corresponding suspended copper foil form a fourth coupling capacitance.

12. The terminal antenna according to claim 11, further comprising a columnar support, wherein the first radiator, the second radiator, and the third radiator each are a copper foil and in an inverted L-shape, and are arranged on a side surface of the columnar support in sequence.

13. The terminal antenna according to claim 11, wherein the first radiator is interdigitally coupled to the second radiator, and the second radiator is interdigitally coupled to the third radiator.

14. The terminal antenna according to claim 11, wherein n=3, and wherein:

a total coupling capacitance between the first radiator and the second radiator is 1 pF, and a total coupling capacitance between the second radiator and the third radiator is 0.45 pF;

the total coupling capacitance between the first radiator and the second radiator comprises the first coupling capacitance between the first radiator and the second radiator and the third coupling capacitance formed by the coupled position between the first radiator and the second radiator and the corresponding suspended copper foil; and the total coupling capacitance between the second radiator and the third radiator comprises the second coupling capacitance between the second radiator and the third radiator and the fourth coupling capacitance formed by the coupled position between the second radiator and the third radiator and the corresponding suspended copper foil.

15. The terminal antenna according to claim 14, wherein the length of the first radiator is 10 mm, the length of the second radiator is 9 mm, and the length of the third radiator is 8 mm.

16. The terminal antenna according to claim 14, wherein the length of the first radiator is 14.7 mm, the length of the second radiator is 13.1 mm, and the length of the third radiator is 10.6 mm.

17. The terminal antenna according to claim 14, wherein a coupling area of the third coupling capacitance formed by the coupled position between the first radiator and the second radiator and the corresponding suspended copper foil is 5.6 mm×2.9 mm; and a coupling area of the fourth coupling capacitance formed by the coupled position between the second radiator and the third radiator and the corresponding suspended copper foil is 2.9 mm×2.9 mm.

18. The terminal antenna according to claim 11, wherein thicknesses of the first radiator, the second radiator, and the third radiator are all 0.05 mm.

19. The terminal antenna according to claim 11, wherein an operating frequency band of the terminal antenna is 2.4 GHz.

20. The terminal antenna according to claim 11, wherein a width of a clearance area of the terminal antenna is 1.5 mm.

* * * * *